Dec. 28, 1926.
W. H. SAUVAGE
FOUNDATION BRAKE RIGGING
Filed May 7, 1926
1,612,781
2 Sheets-Sheet 1
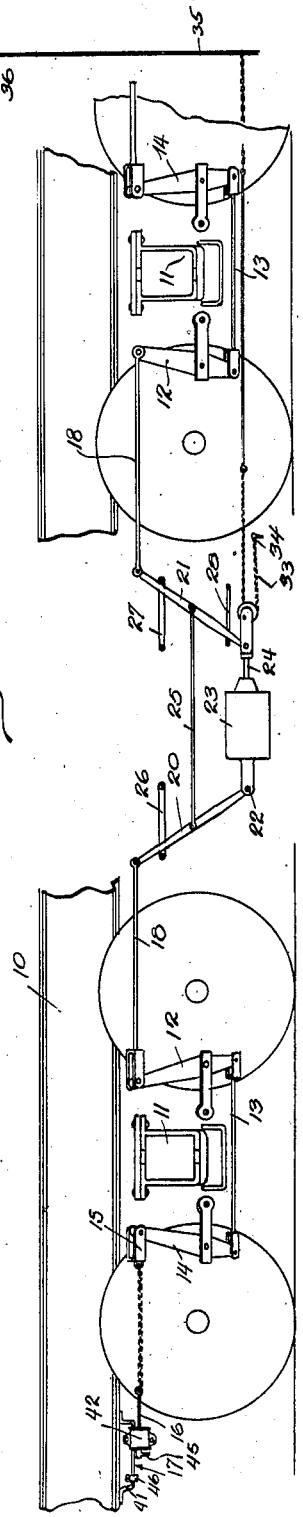
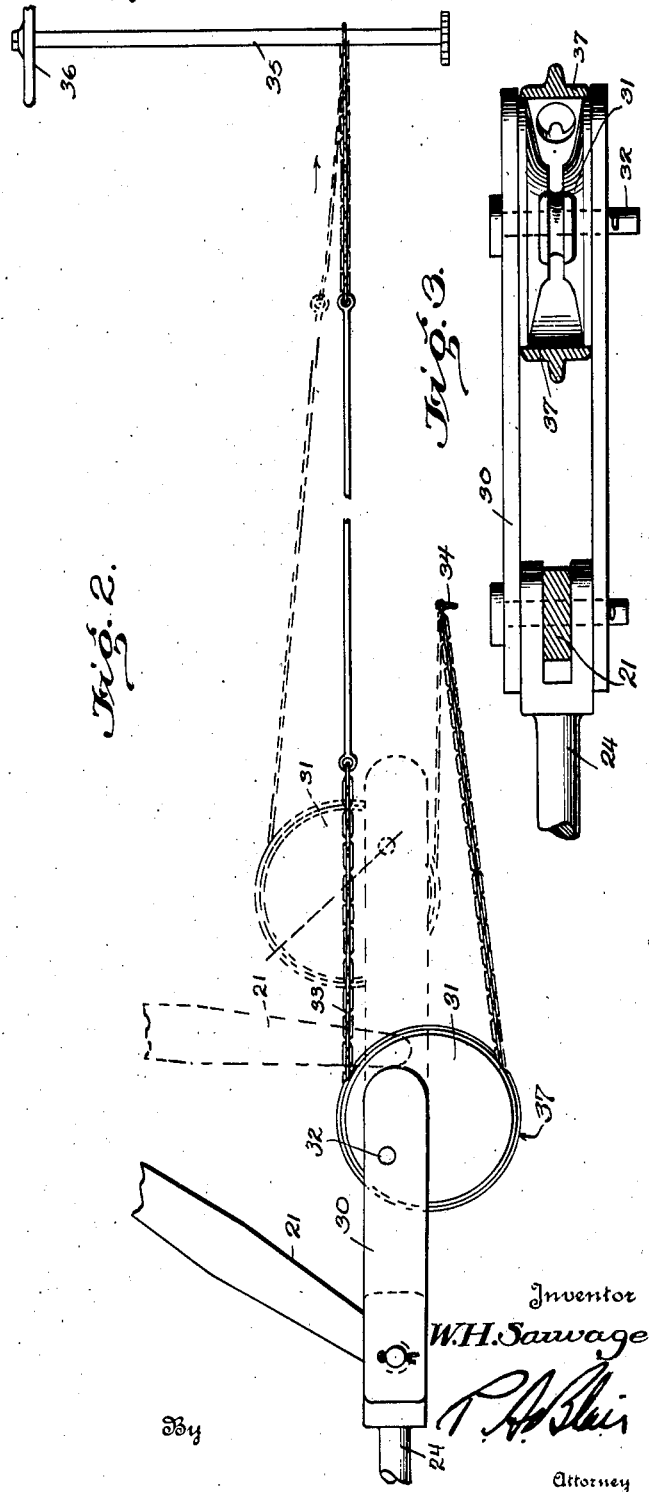
Inventor
W. H. Sauvage
By
Attorney Dec. 28, 1926.
W. H. SAUVAGE
1,612,781
FOUNDATION BRAKE RIGGING
Filed May 7, 1926
2 Sheets-Sheet 2
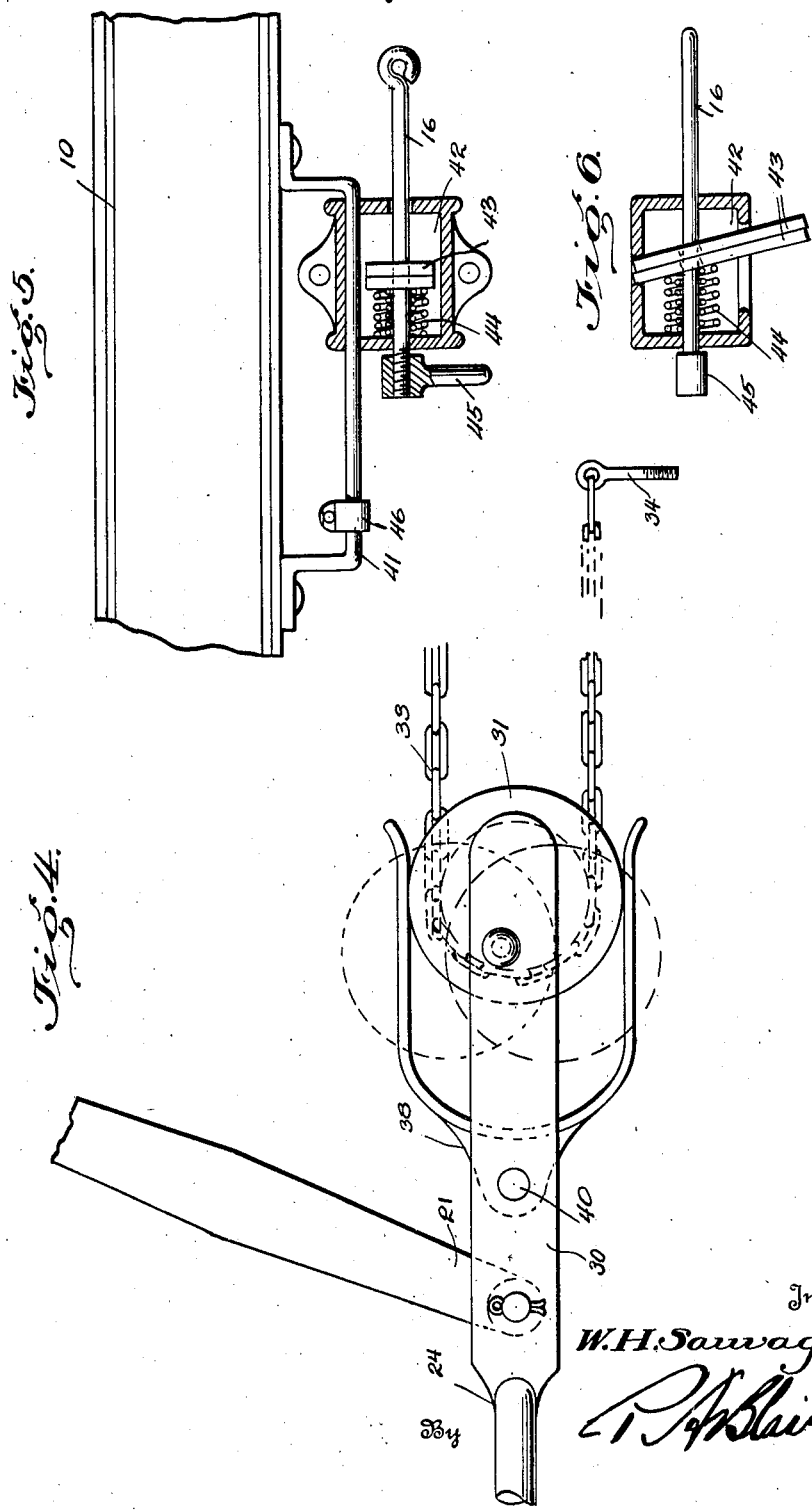

Patented Dec. 28, 1926.

1,612,781

UNITED STATES PATENT OFFICE.

WILLIAM H. SAUVAGE, OF NEW YORK, N. Y., ASSIGNOR TO CHARLES M. O'BOYLE, OF NEW YORK, N. Y.

FOUNDATION BRAKE RIGGING.

Application filed May 7, 1926. Serial No. 107,504.

This invention relates to foundation brake rigging, and more particularly to brake rigging adapted for use on railway cars, such as the common freight or passenger cars now in general use.

Before outlining the objects of the invention, or setting forth a detailed description thereof, it may be stated that the foundation brake rigging of most railway cars now in general use comprises a system of levers at each end of the car adapted to carry brake shoes which in turn coact with the peripheries of the wheels associated with each truck. These brake levers are actuated primarily by the airbrake system, which includes an airbrake cylinder and piston provided with live and dead cylinder levers operatively associated with each other and connected with the brake levers of each truck, whereby as the piston moves outwardly, the brakes are applied. Secondarily, this entire arrangement of brake levers and parts constituting the foundation brake rigging may be actuated by means of hand operated brake mechanism which, for purpose of explanation, may be said to comprise a brake wheel at one end of the car mounted upon a suitable brake staff and flexibly connected by means of a chain or the like to the live lever associated with the airbrake cylinder whereby the actuated end of this lever is moved by hand in substantially the same manner as it would be moved were air applied to the cylinder.

Of course, the airbrake cylinder piston is operated under certain air pressure conditions and a substantially predetermined distance supposed to be maintained at a standard provided for by the rules of the American Railway Association, and the entire construction and arrangement of levers depend upon the definite assumption that the piston will have substantially this uniform and predetermined piston travel at all times from a fixed normal position of rest. Likewise, various types of hand brake operating mechanism have been devised and employed for creating certain power multiplying features to the brake rigging whereby a reliable, powerful and effective application of the brakes may be obtained under certain conditions, as, for example, when the car is disconnected from the engine and coasting into a siding. Various objections have been raised to the different types of hand brake rigging as failing to accomplish the purposes intended, due in part to variations in the amount of travel of the foundation brake rigging in order to insure quick, full and complete braking operation. The present invention contemplates overcoming certain of these objections as will be hereinafter more fully pointed out by combining with the foundation brake rigging and its associated parts certain features in combination whereby uniform travel of the actuated parts may be obtained easily, quickly, and in a reliable and efficient manner regardless of the load in the car or the dependency upon any automatic instrumentalities.

It is, therefore, one of the objects of the present invention to provide a complete foundation brake rigging of the above general character having certain manually operable features associated therewith independent of the airbrake cylinder means of operation, whereby the brakes may be easily maintained in properly regulated position or condition, and in which the handbrake mechanism may be actuated so as to obtain the greatest efficiency and the same power as the airbrake cylinder as and when needed.

A further object of the present invention is to provide a power multiplying device in the foundation brake rigging and operable thru the handbrake mechanism, which will be of unique and simple construction, reliable in operation at all times and not likely to get out of order under any circumstances.

A further object of the invention is to provide a mechanism of the last above mentioned character which will permit the making of instantaneous and accurate manual regulation equal to the exact amount of travel designed to occur by the levers associated with the airbrake cylinder and hand brake.

A further object is to provide a power multiplying device of the above general character in combination with certain manually operable regulating means whereby the maximum leverage of the power multiplying device automatically comes into effect to produce progressively increasing up to the maximum pressure accompanied by progressively decreasing up to the minimum rate of travel to the exact point of application for obtaining the greatest effect.

A further object is to provide a foundation brake rigging of the above general character which will obviate the disadvantages and objections heretofore occurring with certain types of automatic slack adjusters which are intended to maintain the brake rigging in adjusted position, but which are often ineffective due to variations in cylinder pressures, the load upon the trucks, and the variations of standing and running piston travel.

A further object is to provide a foundation brake rigging which will be substantially fool-proof, which may be easily and quickly inspected and instantaneously adjusted, and when so regulated may be depended upon to move all of the operative parts of the foundation brake rigging into proper normal relative position to insure maximum efficiency.

Other objects will be in part obvious and in part hereinafter pointed out in connection with the following analysis of the invention when taken in connection with the accompanying sheets of drawings, illustrating a preferred embodiment of the invention and its various associated parts. In the accompanying sheets of drawings and in the several views of which corresponding parts are indicated by similar reference characters—

Figure 1 is a view showing the complete foundation brake rigging and associated parts in their normal or released position, the central part being diagrammatic;

Figure 2 is a fragmentary view showing the relative position of the power multiplying device in release position in full lines and approaching set position in dotted lines respectively;

Figure 3 is a detailed view partly in section taken at right angles to Figure 2 of a portion of the power multiplying device;

Figure 4 is a detailed view showing a modification of chain guard in full lines with the rolling lever in its two maximum positions as shown in dotted lines;

Figure 5 is a detailed partial sectional view of one form of regulating mechanism at normal position; and Figure 6 is a detailed sectional view taken at right angles thru a portion of Figure 5.

Referring now to these drawings in detail, and more particularly to Figure 1, which it must be borne in mind is partially diagrammatic, there is indicated at 10 the usual draft sill which runs the entire length of the car, and is supported from truck bolsters 11 positioned in the usual manner near its opposite ends. Each truck is provided with brake actuated mechanisms, each of which includes a live lever 12 connected at its lower end by means of push rod 13 to the lower end of dead lever 14, the upper end of which is connected to a normally relatively fixed support 15. This support in most foundation brake riggings comprises a bracket fulcrum extending from one side of the bolster 11, but in the present case the fixed support comprises a jaw 15 at one end of a rod 16, the opposite end of which is mounted in a manually operable regulating mechanism 17 which will hereinafter be described more in detail. This regulating mechanism is attached to both ends of the car, but for convenience of illustration, it will be sufficient to show but one.

The upper ends of the live levers 12 on each truck are connected by means of pull rods 18 to the cylinder levers 20 and 21, the dead lever 20 having its opposite end fixed to fulcrum 22 at the rear end of airbrake cylinder 23 while the live lever 21 is connected to the airbrake cylinder piston 24. These levers 20 and 21 are provided with a connecting rod or link 25 in substantially the manner shown.

It will be noted that the moving ends of the cylinder levers 20 and 21 are supported in hangers 26 and 27 depending from the under side of the car floor. These brackets not only support the levers but are so constructed and designed as to limit the relative movement of the moving ends of the levers 20 and 21, and maintain the same in proper normal position, particularly on full release of the brakes. It will also be noted that the cylinder lever 21 is provided with a second supporting hanger 28 closely adjacent the outer end of the cylinder piston. In normal release position, the levers rest against one end of their respective supporting brackets.

At this point, it may be stated that the usual clearance between the car bolster and the normal position of rest of the truck levers is from four to six inches, and one can readily appreciate the importance of having the cylinder lever guides positioned in such regulated position as to insure that these levers in full release position rest against the ends or stops on their respective guides; for if these stops or guides were not provided, there would be unequal instantaneous regulation of the rigging when the operator actuated one of the regulators; that is, were the inspector to pull one of these devices to full over position, the opposite truck lever would probably be moved into engagement with the truck bolster. When the regulator at the opposite end of the car is actuated, the same might occur and the entire rigging would be thrown out of balance, thus causing uncertain piston travel or handbrake travel when the brakes were applied.

This brake rigging so far described, with the exception of the regulator, illustrates the usual well known form of foundation brake rigging. It differs, however, slightly in different types of cars but in principle is substantially the same in all, and the term used in the claims should be construed broadly accordingly. The parts are so constructed and arranged as to cause a full application of the brakes on outward movement of the cylinder piston and push rod 24.

The free end of this push rod 24, however, may be of somewhat different construction, such as being materially elongated and bifurcated, and carrying at its outer end a power multiplying device preferably of the general type shown in Figures 2 and 3, altho it is preferably a separate part as shown for convenience of attachment to rigging now in use. The cylinder push rod jaw, may be designated as 30, shown in Figure 3, is provided with an eccentrically mounted wheel or rolling lever 31. This rolling lever is pivoted by means of pin 32 passing thru the bifurcated portions of the jaw 30 and is preferably grooved to cooperate with a block or load chain 33, one end of which is anchored or secured to any fixed support indicated at 34, while the opposite end is connected with a conventional handbrake staff 35 provided with an operating hand wheel 36 at the end of the car.

A guard 37 loosely surrounds the wheel 31 throughout the entire portion of its periphery as herein shown, and encloses and keeps the chain 33 in place thereon. A modification of this guard is shown in Figure 4 and comprises a bifurcated shield 38 pivoted at 40 to the push rod jaw 30 and only partially surrounding the wheel. This shield is of such dimensions as to include the maximum dimensions of the block chain wheel or rolling lever 31, and being pivoted at 40 is free to turn as the relative eccentricity changes so as to keep the chain upon the rolling lever at all times. Various other forms of guards may be used, but the above examples are simple, reliable and inexpensive, and are well adapted to accomplish the objects desired.

Referring now to the arrangement shown in Figures 5 and 6, it will be seen that preferably the under side of the sill 10 is provided with a downwardly extending U-shaped bracket 41 supporting a housing 42 containing therein one or more holding dogs 43 normally held in canted position by means of a spring 44 and thru which the rod 16 passes. The end of this rod is provided with an operating handle 45 which may be grasped by the inspector and instantly pulled bodily towards the left to regulate the entire brake rigging when operated at each end of car. As this handle 45 is pulled to the left, the housing 42 and its contained mechanism also moves bodily towards the left until it engages an adjustable stop 46 spaced from the opposite end from the bracket 41 an amount equal to the desired piston or hand brake travel plus the length of the housing 42; that is, the free movement of this housing under normal circumstances and desired range of regulation should be approximately seven inches. Thus, when the handle 45 is pulled forcibly towards the left, this seven inch regulation amount is entirely taken up and the brakes are in applied position. If any excess regulation is required in order to insure the uniform travel of the brake rods, then the rod 16 slips thru the holding dogs to a new relative position, thereby absorbing and eliminating this excess travel. Immediately upon release of the handle 45, the brake rigging drops back to its normal position of rest and takes with it the housing 42 to the opposite end of bracket 41, but further release is prevented by reason of the fact that the holding means 43 within the housing will prevent any slippage or movement of the rod 16 therethru in a direction opposite to the direction of regulation pull. While only one form of regulation is herein shown and described, it is clear that other types may be used in which pawl and ratchet or shims are employed to take up the excess travel of the rod 16 within the housing, and permanently absorb the same.

Now this manual regulator has a very distinct cooperation with the power multiplying device shown in Figures 2, 3 and 4, for example. The eccentric wheel 31 is of such size and occupies such normal position of rest when fully released as to insure a quick take-up during the initial part of the application of the brakes followed by a slower take-up of the brake rigging, but with a material increase in the pressure applied by the brake shoes. In other words, the travel and pressure vary inversely to each other. Thus on the first turn of the brake staff, the eccentric sheave or rolling lever 31 moves from the position of "release" towards the position of "set", and as it makes this partial rotation, the push rod is moved rapidly towards the right under low power and progressively changes to a slower rate of movement at a greater power, the total distance of travel of the push rod 24 should be limited to correspond with the amount to which the regulators at the opposite ends of the car are set by reason of adjustable clamps or washers 46.

From the above it will be seen that when the inspector takes hold of the regulator handle and pulls the rod 16 towards the left until it strikes the end of the bracket or the adjustable washer or clamp 46, any further movement of the rod causes the same to slip freely thru the holding dogs until the brake shoes are hard against the car wheels. When the inspector lets go of the handle, the housing with the dogs and rod 16 recedes towards the right until the other end of the bracket fulcrum is reached. In this manner, the exact movement of the live lever of the trucks and the cylinder lever travel is regulated to the predetermined or desired standard travel of seven inches after the other end of the car is regulated in the same way.

This predetermines the movement of the handbrake rigging so that on any application of the brakes, there will always be exerted a uniform and maximum power on the foundation brake rigging under equal travel. At this point, it may be noted that where the rod 16, Figure 5, passes thru the opposite ends of the dog housing 42, the opening or hole at the right of the housing thru which this rod passes is preferably made sufficiently large to permit free, flexible movement of the rod in all directions, thereby to prevent a possibility of bending of the rod 16 if the brakes are hard applied when the truck is swung around a sharp curve unless a chain is used in part.

It may be also noted that the present invention is adaptable to all existing standard foundation brake rigging now in use, and is far more accurate and reliable than constructions heretofore attempted. By having the chain 33 passing freely around the rolling lever 31 instead of being attached thereto in any way, the rolling lever is free to make a complete revolution, if necessary, and still insure twice the handbrake chain power applied to the operation of the brakes.

From the above, it will be seen that the present invention contemplates a simple and practical foundation brake rigging, which will be fool-proof in its operation, reliable and accurate under all circumstances, and well adapted to accomplish among others all of the objects and advantages set forth herein.

I claim:

1. In combination with a foundation brake rigging of a railway vehicle, a bodily movable power multiplying device having a limited increasing effective range of movement and independently operable means for substantially instantaneously regulating the entire brake rigging and simultaneously resetting said power multiplying device.

2. In combination with a foundation brake rigging of a railway vehicle, a bodily movable power multiplying device having a limited increasing effective range of movement, independently operable means at each end of the car for substantially instantaneously regulating the respective truck brake rigging at each end, and a hand operable means for actuating the power multiplying device for applying the brakes.

3. In combination with a foundation brake rigging of a railway vehicle including an air brake, manually operable means for instantantaneously regulating the entire brake rigging, and a hand operable means for applying the brakes independently of the airbrake, including a bodily movable power multiplying means adapted to produce progressively increasing power with progressively decreasing rate of movement.

4. In combination with a foundation brake rigging of a railway vehicle, manually operable means at each end of the car for instantaneously and independently regulating each truck brake rigging, and a hand operable means for applying the brakes independently of the airbrake, including power multiplying means adapted to produce progressively increasing power with progressively decreasing rate of movement, the maximum normal power increasing movement of the power multiplying device being substantially equal to predetermined piston travel.

5. In combination with a foundation brake rigging of a railway vehicle, manually operable means at each end of the car for instantaneously and independently regulating the entire brake rigging, and handbrake mechanism including a power multiplying device adapted to give the airbrake piston rod a progressively increasing power thru a distance substantially equal to predetermined piston travel.

6. In combination with a foundation brake rigging of a railway vehicle, manually operable means for instantaneously regulating the entire brake rigging, said means comprising a rod connected with one of the dead levers, and a take-up coacting with said rod adapted to be effective when said rod is moved thru a distance greater than the proportional normal piston or handbrake travel to permit slippage of the rod in one direction to take up excess movement of the rigging and prevent relative movement of the rod in the opposite direction, and a power multiplying device having a limited increasing effective range of movement associated with the rigging.

7. In combination with a foundation brake rigging of a railway vehicle, manually operable means for instantaneously regulating the entire brake rigging, said means comprising a rod connected with one of the levers, and take-up means coacting with said rod adapted to be effective when said rod is moved thru a distance greater than the proportional normal piston or handbrake travel to permit slippage of the rod in one direction and take up this excess movement and prevent movement thereof in the opposite direction, and a plurality of depending brackets for supporting the cylinder levers of the foundation brake rigging of such size and location as to insure the cylinder levers resting against stop means at one end of said brackets when the brakes are in full released position, and a power multiplying device having a limited increas- 8. In combination with a foundation brake rigging for railway vehicles, an independently operable regulator connected with one of the truck levers at each end of the car adapted to instantly absorb and permanently take up all excess movement in the brake rigging over and above predetermined normal travel, and a power multiplying device having a limited increasing effective range of movement associated with the rigging.

9. In combination with a foundation brake rigging for railway vehicles, an independently operable instantaneously regulated device connected with one of the truck brake levers at each end of the car having a free movement substantially equal to the application movement for taking up and holding any excess movement occurring during the regulation of the brakes, and a power multiplying device having a limited increasing effective range of movement associated with the rigging.

10. In combination with a foundation brake rigging for railway vehicles, a manually operable instantaneously regulated device connected with one of the truck brake levers one at each end of the car and having a free movement substantially equal to the normal application movement of the live lever for taking up and holding any excess movement occurring during the regulation of the brakes, said regulator including a movable holding device, a rod connected with the truck brake lever, a support for said device along which it may have free movement equally substantial to the application movement of the brakes, means in said device for taking up and holding any excess movement of the rod during the manual regulation of the brakes, and a power multiplying device having a limited increasing effective range of movement associated with the rigging.

11. In combination with a foundation brake rigging for railway vehicles, a manually operable instantaneously regulated device connected with one of the truck brake levers having a free movement substantially equal to the application movement for taking up and holding any excess movement occurring during the regulation of the brakes, said regulator including a movable holding device, a rod connected with the truck brake lever, a support for said device along which it may have free movement equally substantial to the application movement of the brakes, and means in said device for taking up and holding any excess movement of the rod during the manual regulation of the brakes, said last means including a plurality of spring pressed holding dogs having holes thru which said rod is adapted to pass freely in one direction during the regulation of the brakes, but prevent movement of said rod relative to the dogs in the opposite direction when the regulator is released, and a power multiplying device having a limited increasing effective range of movement associated with the rigging.

12. In combination, a manually operable regulator for the foundation brake rigging of railway vehicles comprising at each end of the car a supporting member, a holding device carried by each supporting member, the holding devices being independently operable of each other, a connecting link associated with said device and one of the truck brake levers, means for permitting relative movement of the link with respect to the device in one direction only, and a power multiplying device having a limited increasing effective range of movement associated with the rigging.

13. In combination, a manually operable brake rigging regulator comprising a rod connected with one of the levers, a housing thru which said rod passes, holding means associated with said housing and coacting with said rod, and a support for said parts relative to which said housing may be moved during the regulation of the brakes, means whereby the extent of said movement of said housing may be adjusted, and a power multiplying device having a limited increasing effective range of movement associated with the rigging.

14. In combination, a manually operable brake rigging regulator comprising a rod connected with one of the levers, a housing thru which said rod passes, holding means associated with said housing and coacting with said rod, a support for said parts relative to which said housing may be moved during the regulation of the brakes, means whereby the extent of said movement of said housing may be adjusted, means within said housing adapted to absorb any excess movement of the rod over and above that predetermined movement of the brake rigging during the application of the brakes, and a power multiplying device having a limited increasing effective range of movement associated with the rigging.

15. In combination, a substantially instantaneously operable regulator for brake rigging, comprising a supporting bracket relatively fixed with respect to the car, a housing movable relative to said bracket an extent substantially equal to the normal application movement of the brake rigging, means for moving said housing along said bracket, means within the housing for absorbing and holding any excess movement of the brake rigging above the normal application movement of the rigging when the regulator is actuated, and a power multiplying device having a limited increasing effective range of movement associated with the rigging.

16. In combination with the foundation brake rigging of a railway vehicle, a manually operable regulator associated with each truck at the ends of said vehicle, each regulator comprising a supporting bracket relatively fixed with respect to the car body, a housing movable relative to said bracket an extent substantially equal to the normal application movement of the brake rigging, means for moving said housing along said brake as the brakes are regulated, means within the housing for absorbing and holding any excess movement of the brake rigging above the normal application movement of the rigging during the regulating movement, and a power multiplying device having a limited increasing effective range of movement associated with the rigging.

17. In combination with a foundation brake rigging of a railway vehicle, including an airbrake mechanism and truck brake rigging at each end and cylinder levers, a hand operable means for applying the brakes on both trucks independently of the airbrakes, a power multiplying device having a limited increasing effective range of movement associated with the hand brake, separate means for substantially instantaneously adjusting the brakes of each truck, and means whereby the adjustment of one truck brake rigging will in no way disturb the angularity of the brake levers of the other truck.

18. In combination with a foundation brake rigging of a railway vehicle, including an airbrake mechanism and truck brake rigging at each end and cylinder levers, a hand operable means for applying the brakes on both trucks independently of the airbrakes, a power multiplying device having a limited increasing effective range of movement associated with the hand brake, separate means for substantially instantaneously adjusting the brakes of each truck, and means whereby the adjustment of one truck brake rigging will in no way disturb the angularity of the brake levers of the other truck, said means including supports for the cylinder levers adapted to give said cylinder levers a predetermined angularity with respect to the car body when the brakes are released.

19. In combination with a foundation brake rigging of a railway vehicle including truck brake rigging, an airbrake cylinder, and cylinder levers connected therewith, means associated with each truck brake rigging for substantially instantaneously regulating said brakes for proper brake shoe clearance, and means adapted to prevent the regulating movement of the levers of one truck brake rigging from disturbing the angularity of the brake levers of the other truck.

20. In combination with a foundation brake rigging of a railway vehicle including truck brake rigging, an airbrake cylinder, and cylinder levers connected therewith, means associated with each truck brake rigging for regulating said brakes for proper brake shoe clearance, means adapted to prevent the regulating movement of the levers of one truck brake rigging from disturbing the angularity of the brake levers of the other truck, and hand brake mechanism connected with said brake rigging whereby the brakes may be applied independently of the airbrake mechanism.

21. In combination with a foundation brake rigging of a railway vehicle including truck brake rigging, an air brake cylinder, and cylinder levers connected therewith, means associated with each truck brake rigging for regulating said brakes for predetermined and proper brake shoe clearance, means adapted to prevent the regulating movement of the levers of one truck brake rigging from disturbing the angularity of the brake levers of the other truck, and hand brake mechanism connected with one of said cylinder levers whereby the brakes may be applied independently of the airbrake mechanism, said hand brake mechanism including a bodily movable power multiplying device having a limited and gradually increasing effective range of movement initially determined by said regulating means.

Signed at New York, New York, this 29th day of April, 1926.

WM. H. SAUVAGE.